G. W. BLACKBURN.
SPEED INDICATOR.
APPLICATION FILED JAN. 21, 1915.
1,246,043.
Patented Nov. 13, 1917.
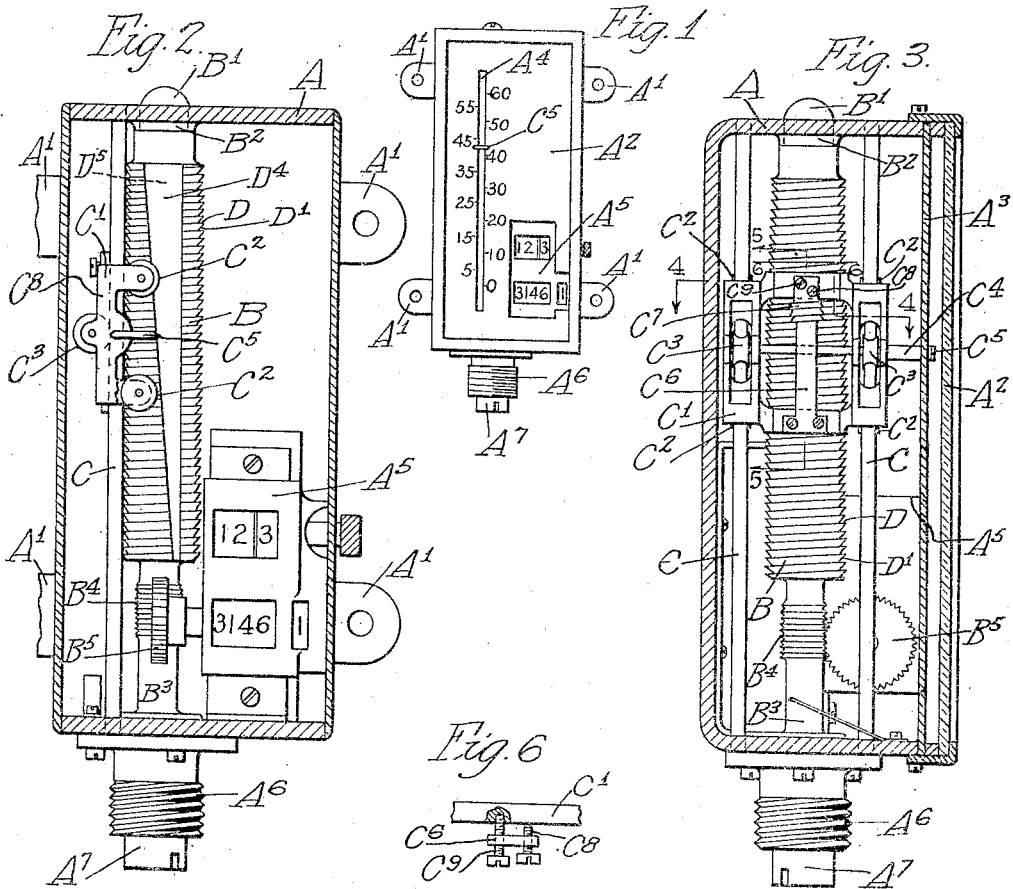
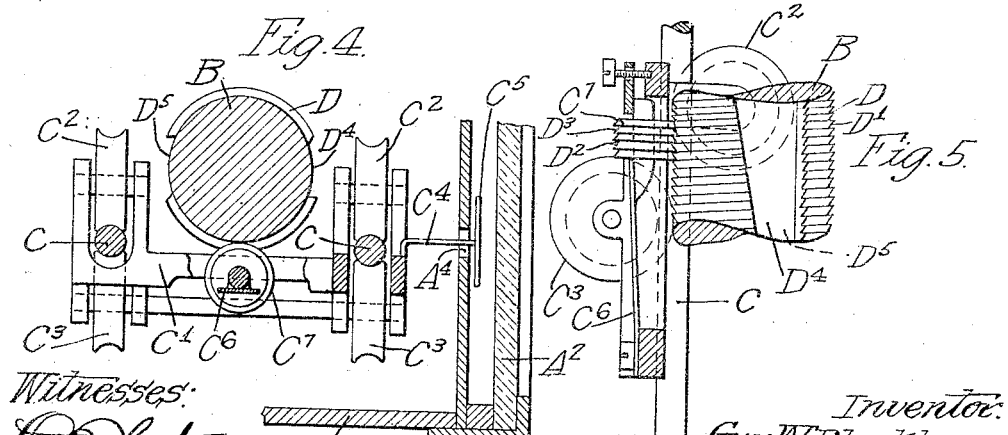
Witnesses:
Inventor:
Guy W. Blackburn
by Parker & Carter
his Attys

UNITED STATES PATENT OFFICE.

GUY W. BLACKBURN, OF ELGIN, ILLINOIS.

SPEED-INDICATOR.

1,246,043.

Specification of Letters Patent.

Patented Nov. 13, 1917.

Application filed January 21, 1915. Serial No. 3,589.

*To all whom it may concern:*

Be it known that I, GUY W. BLACKBURN, a citizen of the United States, residing at Elgin, in the county of Kane and State of Illinois, have invented a certain new and useful Improvement in Speed-Indicators, of which the following is a specification.

My invention relates to improvements in speed indicators, and has for one object to provide a new and improved form of speed indicator of the tachometer type for indicating the speed of all kinds of moving members. It is particularly designed for use in connection with a speedometer for automobiles and the like, although it is of course obvious that other uses may be equally important. My invention is illustrated more or less diagrammatically in the accompanying drawings, wherein Figure 1 is a front elevation of the speedometer.

Fig. 2 is a section through the speedometer case on an enlarged scale, showing the working parts in elevation.

Fig. 3 is a section through the speedometer case on the same scale, showing the working parts in side elevation.

Fig. 4 is a section along the line 4—4 of Fig. 3.

Fig. 5 is a detail side elevation in part section along the line 5—5 of Fig. 3.

Fig. 6 is a detail section along the line 6—6 of Fig. 3.

Like parts are indicated by the same letter in all the figures.

I have, for the sake of convenience and clearness, confined my showing and discussion to the so-called speedometer or speed indicator head, namely that part of the instrument which registers the result, and I have omitted all reference to the driving shaft, driving connections and the like, except so far as they are directly connected to and form a part of the speedometer head.

A is a rectangular housing or box provided with lugs $A^1$, in order to make its attachment to any suitable appointment of support. This box has a glass cover $A^2$, and behind the glass cover a dial or indicator plate $A^3$ slotted as at $A^4$. It will be understood that the housing normally assumes a vertical position, and that therefore the slot in the dial plate is a vertical one. This disk is divided into suitable space intervals and lettered or indexed for miles per hour, revolutions per minute, or any suitable quantity which it is desired may be read direct from the instrument. For the sake of convenience I have illustrated it as an automobile speedometer, and therefore the scale is divided into miles per hour. $A^5$ is the usual type of odometer contained in the housing of the speedometer for the purpose of computing the mileage covered, or the total number of revolutions or anything else as the case may be. $A^6$ is a connection head provided for the purpose of connecting the speedometer in this case to the flexible shaft, which transmits the power from the moving part to the speedometer and $A^7$ is a stub end shaft slotted as indicated in connection with such flexible shaft.

B is a vertical mutilated screw. It is free to rotate in the housing being guided at its upper end by the pin $B^1$ in bearing $B^2$ supported and guided at its lower end by the stem $B^3$ mounted on the stub end shaft $A^7$, and carrying a worm $B^4$ to drive a worm wheel $B^5$ which in turn operates the odometer.

C, C, are guide rods or rails held in the housing A parallel with the axis of the screw B. $C^1$ is a carriage having grooved rollers or wheels $C^2$, $C^2$, $C^3$, $C^3$, engaging opposed sides of the track bars C to limit the carriage to movement along such bars parallel with the axis of the shaft. This carriage carries a finger $C^4$ which projects out of the slot $A^4$, and terminates in a pointer $C^5$. $C^6$ is a spring arm fastened at one end in fixed position on the carriage C. It carries at its other end rotatably mounted thereon a grooved roller $C^7$. This grooved roller and the relation between it and the slot is important, as will later appear.

It will be noted that the spring tends to press the roller yieldingly against the screw B, and the roller is limited in its movement toward the screw by the set screw $C^8$ screw-threaded in the end of the spring, and having its end in opposition to the carriage C. The movement of the spring and roller in the opposite direction is limited by the screw $C^9$ screw-threaded in the carriage $C^1$, and in slidable engagement with the end of the spring.

It will be noted that the screw B is equipped with a so-called quintuple thread, that is to say, there are five separate threads about the screw, and a point following one of these threads for a complete revolution about the screw will move along at a distance equal to five times the width of the individual thread. Thus I provide a fine sharp thread with a comparatively great advance. Moreover, these threads have, as indicated, a flat upper surface D, and an inclined end surface D¹. It will be noted that the roller C⁷ is corrugated or grooved, but not threaded. That is to say, the roller has a series of annular corrugations about its periphery. In my preferred form there are five of them. Each one of them is located in a plane perpendicular to the axis of the roller. Each one of them has a flat end surface D², and an inclined upper surface D³ of exactly the same dimensions as the screw threads on the screw B. The axis of the roller is inclined so that it is perpendicular to the plane of the flat surface of each of the threads on the screw B at the point nearest to the roller. The result of this is that the five annular grooves on the roller engage each one of the threads on the screw in smooth contact, and since the roller is spring pressed against the screw, it will be obvious that the carriage and roller can be pushed upward along the screw since the inclined surface on the thread and the inclined surface on the roller will slide one on the other to permit passage, but the roller cannot be moved down because the flat surface of the thread and the flat surface of the grooves are in engagement.

D⁴, D⁵ are notches formed in the side of the screw B, gradually increasing in width from the bottom upwardly so that while the screw-thread is almost continuous at the bottom, it is gradually shortened toward the top until at the extreme upper end a very appreciable portion of the screw thread is cut away. These two notches are thus substantially V-shaped. In my preferred form one side of the V is substantially parallel with the axis of the screw, and the other inclined thereto, though under some circumstances it might be desirable to change this relation. Moreover, as indicated, one side of the V is inclined, and the other substantially radial, as shown in Fig. 4.

It is obvious that, while I have preferred a particular number of threads, other thread combinations might be used, and that while I have used two slots, other slot combinations might be used. My experience shows, however, that best results are obtained when such a number of slots and such a number of threads are used that the product of the two numbers is an uneven quantity. My experience further shows that it is desirable to have one an even quantity, and the other an odd quantity, and I therefore show five threads and two slots, although it is perfectly obvious that other combinations may produce the desired result.

It will be evident that while I have shown in my drawings an operative device, still many changes might be made in size, shape and arrangement of parts without departing from the spirit of my invention.

The use and operation of my invention are as follows:—

With the parts at rest the carriage is at the bottom of its travel, and it points to zero. As the screw commences to rotate the carriage will commence to rise, being drawn up by the rotation of the screw in engagement with the roller. The roller is free to turn, and since it has five grooves in engagement with five threads, the friction wear or load on any single groove or thread is a minimum. The carriage will thus rise until the roller comes in contact with the slot, but it will then fall freely under the influence of gravity. If at this point the threaded cylinder ceases its rotation, the roller will fall clear back to zero, but if it continues its rotation, the roller will not have time to fall back to zero, and will be caught at some intermediate position and rise this time a little farther until it reaches the next slot. This will continue until the carriage being drawn up by the roller, has climbed to such a height that when the roller leaves the thread and comes to the slot, the carriage has time to fall only just as far as it is carried up by the thread before the next slot is reached. At that time the carriage will come substantially to rest, fluctuating, of course, slightly but not appreciably, indicating a certain speed. Thus a speed indication depends on the velocity of the thread cylinder and the width of the groove at any point. If high speeds are to be shown, a groove of rapidly increasing width is used; if a lower speed, a groove of less rapidly increasing width.

It is necessary to have a very fine thread on the cylinder, because otherwise as the carriage moves up and down its fluctuations between contacts with the slot will be too great. If the slots are narrow, and if the threads are fine, very close accuracy may be obtained.

In other words, as the threaded cylinder rotates it propels the carriage upwardly until a point is reached at which the carriage has just time to fall while out of contact with the thread the distance which it was raised while in contact with the thread and at that point experience shows the carriage will rest until the speed changes at normal speeds in such fluctuations as will be visible to the eye.

By quintuple thread I mean a thread which in width from one thread to the other is equal to one-fifth of the advance made along the screw by each thread during each complete revolution, that is to say, in order to keep the threads fine and at the same time get a sufficient advance per revolution as five separate spiral threads wound side by side about the spindle.

At the point where the roller is located, the threads on the spindle are inclined, the threads on the spindle have a distorted V-shaped contour, the threads on the roller have the same general contour only reversed of that of the roller threads to engage the spindle threads in order that the roller may climb the screw under the influence of the screw thread alone. The roller is not screw threaded but carries on its periphery, a series of annular threads, each one parallel to the others, in order that the flat surface on each of these threads may engage the flat surface on each of the spindle threads. This roller is inclined and its inclination to the spindle is just enough to bring it into parallelism with a line perpendicular to the upper surface of the spindle thread at the point of contact.

If the spindle were merely threaded and not slotted the carrier would upon rotation of the spindle, move from bottom to top of the spindle and then be able to move no farther because there would then be a direct constant drive connection between the spindle and the indicator. In order that the position of the indicator may give a result which may be read in speed revolutions, per minute, miles per hour, or the like, it is necessary that there be some variable connection or relation between the driving spindle and the responding carrier. This variable relation enters in with the slot which makes the thread discontinuous and causes the carrier to be driven only through a portion of each revolution of the spindle. During the remaining portion the carrier is free to fall under the influence of gravity. As the spindle turns the carrier is raised a certain distance and this raising continues until the end of the thread is reached, the carrier then drops under the influence of gravity, but before it has time to drop very far, the end of the thread comes around again and raises it some more. The faster the spindle rotates the shorter will be the time for the indicator to drop during each period of disconnection and so the spindle will catch the carrier before it returns under some circumstances to the place from which it started and thus if the slot were straight sided the spindle would drive the carrier up by a series of separate implements, provided only the rate of rotation of the spindle were great enough to catch the carrier before it completes its return under the influence of gravity.

If the slot gradually increases in width upwardly the time available during each revolution for the downward fall of the indicator will gradually increase as the indicator moves upwardly, and a point will ultimately be reached where a further rise of the indicator will bring it in line with such slot width that the indicator will fall back just as far as it came up. At this point it will stay oscillating possibly, but wavering at the general level wherein the time available for the return is just sufficient to enable the indicator to drop to the position from which it started. If the speed rises, that point will be higher. If the speed drops that point will be lower.

Given the above relation between the indicator and discontinuous thread, it is perfectly easy to calibrate a scale which will give a direct reading in speed, miles per hour or revolutions per minute as the case may be. If the speed range is to be very great the difference in width of slot between top and bottom must be very great, the speed range to be small, then in variation with the width of the slot also will be small. The slot is only important because it makes the thread discontinuous. It might have one slot or a series of slots, and the downward drop of the indicator may occur once every revolution or a number of times every revolution. I prefer to have it occur twice and to use a quintuple thread, and I find that it is best to have either the thread odd and the number of slots even, or to have the number of slots odd and the thread even, because this times the revolutions between the parts so as at least to a considerable extent to prevent vibration and frustrating of the needle.

I claim:

1. A speed indicator comprising a rotatable mutilated screw, the effective length of the screw thread progressively decreasing upwardly, a carrier in contact with said screw, and means comprising said screw for raising said carrier.

2. A speed indicator comprising a screw, portions of the thread of said screw being cut away, said cut away portions increasing in width from the bottom of said screw upwardly, and a carrier free to slide in a direction parallel with the axis of said screw and in contact with said screw.

3. A speed indicator comprising a vertical screw having thereon discontinuous threads, and a carrier free to slide therealong and provided with thread engaging means free to move only in a path parallel with the axis of the screw, and a scale along which said carrier slides with a finger on said carrier in opposition to said scale.

4. A speed indicator comprising a vertical screw having thereon discontinuous threads, and a carrier free to slide therealong and provided with means engaging said threads, said discontinuous threads decreasing in length upwardly.

5. A speed indicator comprising a vertical screw having thereon discontinuous threads, a carrier free to slide therealong and provided with means engaging said threads, and a scale along which said carrier slides, said discontinuous threads decreasing in length upwardly.

6. A speed indicator comprising a vertical screw having thereon discontinuous threads, a carrier free to slide therealong and provided with means engaging said threads, a scale along which said carrier slides, and a finger on said carrier in apposition to said scale, said discontinuous threads decreasing in length upwardly.

7. A speed indicator comprising a vertical screw, a carrier slidably mounted and free to travel in a path parallel with the vertical screw, the vertical screw having fixed continuous threads and means comprising a screw engaging member projecting outwardly from the carrier into the path of the threads and held against movement in any direction except parallel with the axis of the screw for intermittently raising the carrier along the screw responsive to the rotation thereof.

8. A speed indicator comprising a screw threaded spindle, means for rotating it, said spindle having beveled flat sides interrupting the screw-threaded portions, a carrier slidable parallel with said spindle, and a spring mounted on said carrier in engagement wth said screw, said spring being always held in line with the screw threads.

9. In a speed indicator a dial, a pointer mounted for movement therealong and means for operating the pointer comprising a screw-threaded cylinder having a plurality of slots in the periphery interrupting the screw-thread and increasing in width upwardly.

10. In a speed indicator a dial, a pointer mounted for movement therealong and means for operating the pointer comprising a screw-threaded cylinder having a plurality of slots in the periphery interrupting the screw-thread and increasing in width upwardly and a yielding connection between the cylinder and the pointer.

11. In a speed indicator a screw-threaded cylinder having a plurality of slots in the periphery thereof interrupting the screw-thread and increasing in width upwardly and a carriage mounted for movement parallel with the axis of the cylinder and a connection between them.

12. In a speed indicator a screw-threaded cylinder having a plurality of slots in the periphery thereof interrupting the screw-thread and increasing in width upwardly and a carriage mounted for movement parallel with the axis of the cylinder and a yielding connection between them.

13. In a speed indicator a screw-threaded cylinder having a plurality of slots in the periphery thereof interrupting the screw-thread and increasing in width upwardly and a carriage mounted for movement parallel with the axis of the cylinder and a connection between them, said connection comprising a grooved roller in engagement with the screw-thread.

14. In a speed indicator a screw threaded cylinder having a plurality of slots in the periphery thereof interrupting the screw-thread and increasing in width upwardly and a carriage mounted for movement parallel with the axis of the cylinder and a yielding connection between them comprising a grooved roller and a spring upon which it is mounted for rotation and which thrusts the roller yieldingly into engagement with the threads.

15. In a speed indicator a screw-threaded cylinder having a plurality of slots in the periphery thereof interrupting the screw-thread and increasing in width upwardly and a carriage mounted for movement parallel with the axis of the cylinder and a connection between them, said connection comprising a grooved roller in engagement with the screw-thread, the grooves on said roller being substantially the same shape and size as the screw-threads.

16. In a speed indicator a screw-threaded cylinder having a plurality of slots in the periphery thereof interrupting the screw-thread and increasing in width upwardly and a carriage mounted for movement parallel with the axis of the cylinder and a yielding connection between them comprising a grooved roller and a spring upon which it is mounted for rotation and which thrusts the roller yieldingly into engagement with the threads, the grooves on said roller being substantially the same shape and size as the screw-threads.

17. In a speed indicator a screw-threaded cylinder having a plurality of slots in the periphery thereof interrupting the screw-thread and increasing in width upwardly and a carriage mounted for movement parallel with the axis of the cylinder and a connection between them, said connection comprising a grooved roller in engagement with the screw-thread, the axis of the roller being inclined to the axis of the cylinder.

18. In a speed indicator a screw-threaded cylinder having a plurality of slots in the periphery thereof interrupting the screw-thread and increasing in width upwardly and a carriage mounted for movement parallel with the axis of the cylinder and a yielding connection between them comprising a grooved roller and a spring upon which it is mounted for rotation and which thrusts the roller yieldingly into engagement with the threads, the axis of the roller being inclined to the axis of the cylinder.

19. In a speed indicator a screw-threaded cylinder having a plurality of slots in the periphery thereof interrupting the screw-thread and increasing in width upwardly and a carriage mounted for movement parallel with the axis of the cylinder and a connection between them, said connection comprising a grooved roller in engagement with the screw-thread, the relative position of spindle and roller being such that the threads on the spindle and the grooves on the roller where they contact each other, lie in the same plane.

20. In a speed indicator a screw-threaded cylinder having a plurality of slots in the periphery thereof interrupting the screw-thread and increasing in width upwardly and a carriage mounted for movement parallel with the axis of the cylinder and a yielding connection between them comprising a grooved roller and a spring upon which it is mounted for rotation and which thrusts the roller yieldingly into engagement with the threads, the relative position of spindle and roller being such that the threads on the spindle and the grooves on the roller where they contact each other, lie in the same plane.

21. In a speed indicator a screw-threaded cylinder having a plurality of slots in the periphery thereof interrupting the screw-thread and increasing in width upwardly and a carriage mounted for movement parallel with the axis of the cylinder and a connection between them, the screw threads having an upper substantially flat surface and a lower sharply inclined surface.

22. In a speed indicator a screw-threaded cylinder having a plurality of slots in the periphery thereof interrupting the screw-thread and increasing in width upwardly and a carriage mounted for movement parallel with the axis of the cylinder and a connection between them, the screw-threads having an upper substantially flat surface and a lower sharply inclined surface, the connection between the carriage and threads comprising a grooved roller, the grooves of which have upper sharply inclined surfaces and lower substantially flat surfaces to engage the thread.

23. In a speed indicator a screw-threaded cylinder having a plurality of slots in the periphery thereof interrupting the screw-thread and increasing in width upwardly and a carriage mounted for movement parallel with the axis of the cylinder and a connection between them, said carriage being free to move upwardly along the cylinder at all times and under all circumstances, but held against movement downwardly along the cylinder except when in line with one of said slots.

24. A speed indicator comprising a screw threaded spindle, a carriage, a yielding connection between the carriage and the screw threads of spindle, the screw threads being discontinuous the length of the break in the threads increasing upwardly, means for rotating the spindle to bring the connection into intermittent operative connection with the screw threaded spindle to move the carriage along the screw, and yielding means for resisting such movement.

25. In a speed indicator comprising a screw threaded cylinder, a slot in the periphery thereof interrupting the screw threads and increasing in width upwardly, means for rotating the cylinder, a carriage free to move along the cylinder, and a member carried by the carriage adjacent the cylinder and so positioned as to be in register with the threads, but to be out of engagement with the cylinder when the slot is in register with the connection.

26. A speed indicator comprising a screw threaded spindle and means for rotating it, a carrier free to move along the spindle, slots in the surface of the spindle increasing in width upwardly, the screw threads on the periphery of the spindle being extremely narrow, there being a plurality of separate threads on the periphery of the spindle and a connection between the carriage and threads.

27. A speed indicator comprising a screw threaded spindle and means for rotating it, a carrier free to move along the spindle, and a connection between it and the threads, slots in the surface of the spindle interrupting the threads and increasing in width upwardly, the screw threads on the periphery of the spindle being so arranged that each individual thread extending once around the spindle moves along the spindle a distance equal to the thickness measured accurately by the number of threads.

28. A speed indicator comprising a screw threaded spindle and means for rotating it, a carrier free to move along the spindle, and a connection between it and the threads, slots in the surface of the spindle interrupting the threads and increasing in width upwardly, the screw threads on the periphery of the spindle, being so arranged that each individual thread extending once around the spindle moves along the spindle a distance equal to the thickness measured accurately by the number of threads, the number of such threads being such that the sum of such threads and the number of slots is always an uneven number.

In testimony whereof, I affix my signature in the presence of two witnesses this 14th day of January 1915.

GUY W. BLACKBURN.

Witnesses:
MINNIE M. LINDENAU,
CHRISTINA DEANS.

Copies of this patent may be obtained for five cents each, by addressing the "Commissioner of Patents, Washington, D. C."